R. HEDSTROM.
REVERSIBLE TOOL HOLDER.
APPLICATION FILED MAR. 13, 1909.
945,532.
Patented Jan. 4, 1910.
2 SHEETS—SHEET 1.
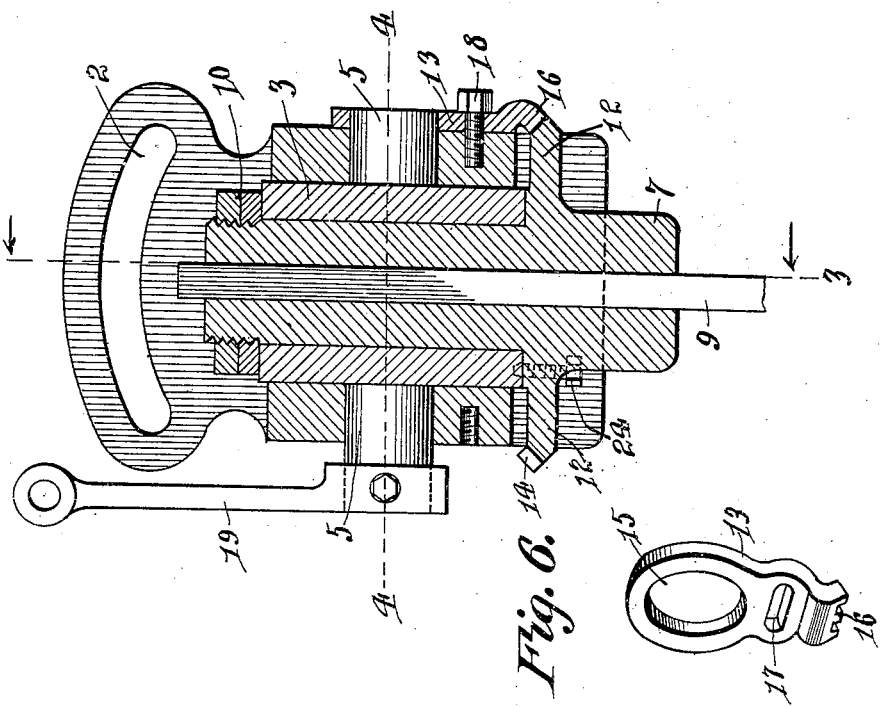
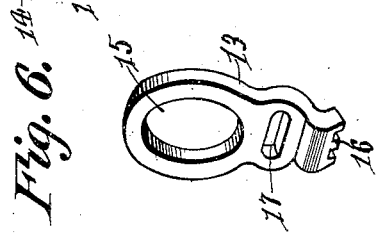
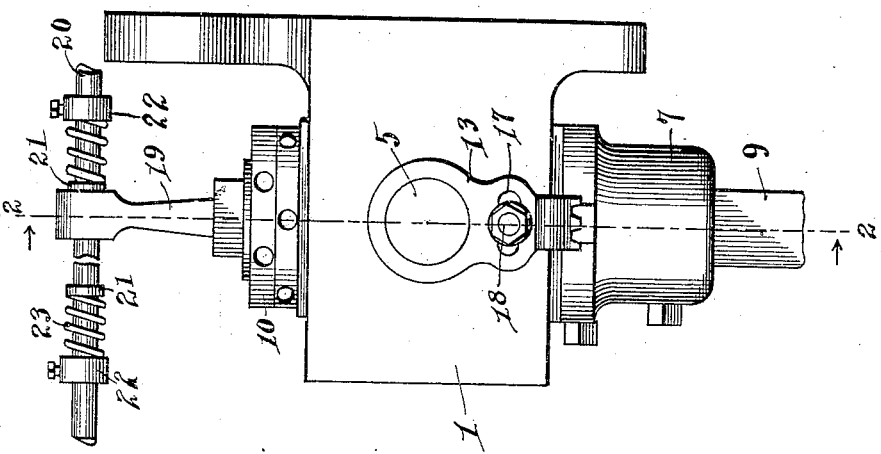
Witnesses
William C. Sinton.
Van B. Hillyard.
Inventor
Rudolph Hedstrom
By Victor J. Evans
Attorney R. HEDSTROM.
REVERSIBLE TOOL HOLDER.
APPLICATION FILED MAR. 13, 1909.
945,532.
Patented Jan. 4, 1910.
2 SHEETS—SHEET 2.
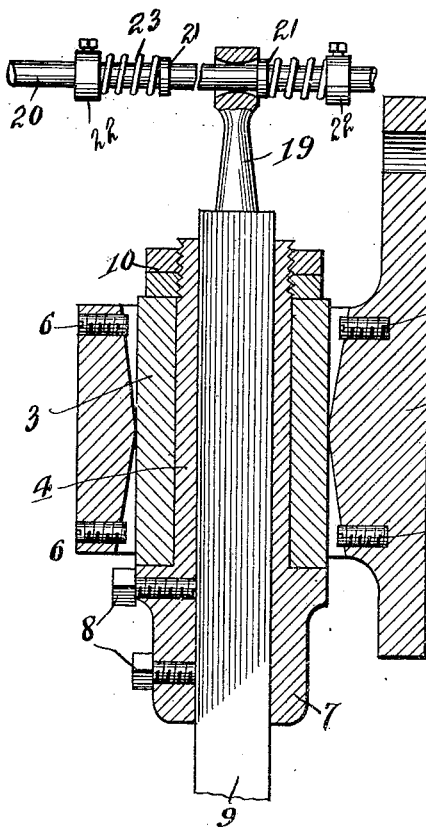
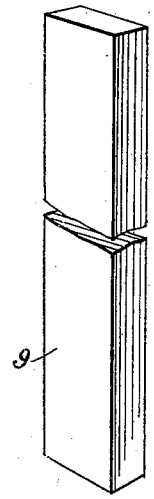
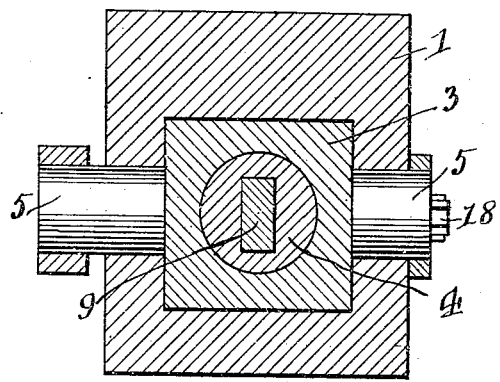
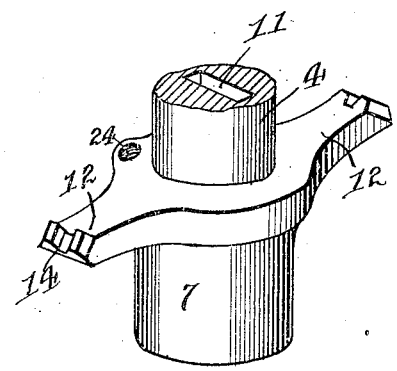
Inventor
Rudolph Hedstrom.
Witnesses
William C Linton.
Van B. Hillyard.
By Victor J. Evans
Attorney

UNITED STATES PATENT OFFICE.

RUDOLPH HEDSTROM, OF ATLANTIC, MASSACHUSETTS.

REVERSIBLE TOOL-HOLDER.

945,532.   Specification of Letters Patent.   Patented Jan. 4, 1910.

Application filed March 13, 1909. Serial No. 483,248.

*To all whom it may concern:*

Be it known that I, RUDOLPH HEDSTROM, a citizen of the United States, residing at Atlantic, in the county of Norfolk and State of Massachusetts, have invented new and useful Improvements in Reversible Tool-Holders, of which the following is a specification.

This invention appertains to tool holders for metal working machines, and most essentially for planers, the purpose being to enable work to be performed in both the forward and backward travel of the work, thereby practically doubling the capacity or out-put of the machine.

The invention contemplates a tool holder adapted to automatically change or reverse the position of the tool and also to change the inclination thereof laterally whereby ample clearance is had in both directions.

For a full understanding of the invention, reference is to be had to the accompanying drawings and the following description in which corresponding and like parts are indicated by the same reference characters.

The invention consists of the novel feature, details of construction, and combinations of parts which will be set forth more fully in the following description and pointed out in the appended claims and which are illustrated in the drawings hereto attached in which:

Figure 1 is a view in elevation of a tool holder embodying the invention. Fig. 2 is a vertical section on the line 2—2 of Fig. 1 looking in the direction of the arrows, the tool, the operating arm and the trunnions being in full. Fig. 3 is a section on the line 3—3 of Fig. 2 looking to the left as indicated by the arrows, the upper portion of the operating or rocker arm being in section. Fig. 4 is a horizontal section on the line 4—4 of Fig. 2. Fig. 5 is a detail perspective view of a portion of the tool holder showing the laterally extended arms. Fig. 6 is a detail perspective view of the trip. Fig. 7 is a side view of a cutting tool.

The tool holder comprises a bracket 1 adapted to be secured to the shaper head, tool block or other part of the machine with which the device is adapted to coöperate. The bracket comprises a base and a projecting portion, the base having an arcuate slot 2 to receive the fastening means employed for attaching the bracket to the support. The projecting portion is formed with an opening which flares in opposite directions from a middle point. A block 3 is mounted within the opening of the bracket 1 and is preferably of square form in horizontal section as indicated most clearly in Fig. 4. The block 3 has a circular opening in which is fitted a tool holder 4 of circular form in horizontal section thereby admitting of said tool holder having a rotary movement within the block. The block 3 is prevented from lateral play in one direction and has a limited tilting movement in the direction of movement of the work so that the tool may be adjusted for proper clearance according to the direction of travel of the work. Trunnions 5 project from opposite sides of the block 3 and are mounted in the bracket 1 and project a short distance beyond opposite sides of the bracket. The block 3 is adapted to oscillate or tilt upon the trunnions 5, the degree of movement being regulated by a series of set screws 6 let into threaded openings in opposite ends of the flared walls of the opening of the bracket in which the block 3 is mounted. By proper adjustment of the set screws 6, the tilting of the block 3 may be regulated to vary the clearance of the tool and to allow for uneven grinding of the tool when sharpening the same. The bracket 1 may be of any construction to admit of the block 3 being easily placed in position.

The tool holder 4 is of rounded or cylindrical form and mounted in the block 3 to turn therein. One end of the tool holder is enlarged to form a head 7 which receives set screws 8 for holding the tool 9 in place. The opposite end portion of the tool holder is threaded and receives set nuts 10 which in conjunction with the head 7 retain the tool holder within the block 3. An opening 11 extends through the tool holder to receive the tool 9. Arms 12 project laterally in opposite directions from the tool holder and coöperate with a trip 13 to automatically turn the tool holder and tool to secure lateral clearance of the latter. The arms 12 preferably form a part of the tool holder and project from the head 7 and terminate in cogs 14. The trip 13 is adapted to be secured to a side of the bracket 1 in position to coöperate with either one of the arms 12 so as to effect a turning of the tool holder simultaneously with the tilting or rocking of the block 3. The trip 13 is in the nature of a lever having an opening 15 at one end and cogs 16 at its opposite end, said cogs being adapted to mesh with the cogs 14 of the arms 12. The opening 15 is adapted to receive the projecting end of either one of the trunnions 5. A transverse slot 17 is formed in the trip and receives a set screw 18 which is threaded into the bracket 1 and serves to secure the trip in the adjusted position. The trip 13 may be secured to either side of the bracket with its opening 15 receiving the trunnion 5 upon the same side of the bracket. When the set screw 18 is tightened the trip is prevented from movement as will be readily understood. By having the trip movable from one side of the bracket to the other, the tool holder may be adapted for right or left hand work.

The operating arm 19 is secured to one of the trunnions 5 and is adapted to have a rocking movement imparted thereto for tilting the block 3 according to the direction of travel of the work so as to secure ample clearance for the tool. The upper end of the arm 19 terminates in an eye through which a rod 20 passes, said rod being supplied with adjustable and yieldable stops 21 upon opposite sides of the arm 19 to engage therewith. Set collars 22 are adjustable upon the rod 20 and sustain the end thrusts of coil springs 23 which are provided at the ends remote from the said collars with washers constituting the stops 21. The rod 20 may be attached to any convenient part of the machine so as to enable automatic operation of the stops 21 to actuate the rocker arm 19 and effect movement of the block 3 upon the trunnions 5 so as to incline the tool 9 in the proper direction to secure clearance.

In the event of the tool 9 being of rectangular form in transverse section, its operating end is ground square with the sides of the tool, hence, in order to give proper clearance it is necessary to incline the tool both longitudinally and laterally. This result is effected automatically by the tilting of the block 3 and the turning of the tool holder 4 within the block. The block 3 is tilted at each complete travel of the work by coöperation of the stops 21 and rocker arm 19 and as the block 3 tilts the arm 12 of the tool holder in engagement with the trip 13 is turned, thereby imparting a partial rotation to the tool holder which adjusts the tool angularly to provide lateral clearance. It sometimes happens that the tool holder cannot be advantageously reversed, as for instance, when cutting keyways or when the cut is made up to a raised surface and under these conditions, the tool holder is turned in the block 3 to a central position and is secured to the block by means of a set screw 24, which is threaded into an opening formed in one of the arms 21. In order that the tool may cut both in its forward and in its rearward travel, its cutting end is ground square, as heretofore indicated, the clearance being obtained by inclining the tool so as to bring one or the other of the cutting edges into operative position. While the tool holder is secure to the block 3, the latter, nevertheless, is free to turn upon its trunnions 5 so as to incline the tool forwardly or rearwardly. In order that this operation may be effected, it is necessary to either remove the trip 13 or to loosen the same upon the trunnion 5, whereby the latter may turn therein without imparting any movement to the trip.

Having thus described the invention, what is claimed, is:

1. In combination, a support, a block mounted in the support and adapted to have a tilting movement imparted thereto, a tool holder rotatably mounted in the block, and having an arm projected laterally therefrom, and a trip attached to said support and adapted to coöperate with the arm of the tool holder to impart a rotary movement thereto simultaneously with the tilting of the block.

2. In combination, a support, a block mounted in the support and having oppositely disposed trunnions, a tool holder mounted in the block to turn therein and having oppositely extending arms, a trip adapted to be mounted upon either trunnion of the block and to engage with the adjacent arm of the tool holder, and means for securing the trip to the support in the adjusted position, the parts being disposed to effect a simultaneous longitudinal and lateral movement of the tool and to provide both for longitudinal and lateral clearance.

3. In combination, a support having an opening which is flared in opposite directions from an intermediate point, a block mounted in the opening of the support and provided with oppositely extending trunnions, means for limiting the tilting movement of the block, a rotary tool holder mounted in the block and provided with oppositely extended arms, a trip adapted to be mounted upon either trunnion and to coöperate with the adjacent arm of the tool holder, means for securing the trip to the support in the adjusted position, and means for tilting said block.

In testimony whereof I affix my signature in presence of two witnesses.

RUDOLPH HEDSTROM.

Witnesses:
LUCY A. O'NEIL,
SADIE MACLEAN.